United States Patent
Chen et al.

(10) Patent No.: US 10,928,547 B2
(45) Date of Patent: Feb. 23, 2021

(54) TERAHERTZ SECURITY CHECK METHOD AND SYSTEM COMPRISING A MARKER IDENTIFICATION MODULE AND A MARKER CHANGING MODULE

(71) Applicants: CHINA COMMUNICATION TECHNOLOGY CO., LTD., Shenzhen (CN); SHENZHEN INSTITUTE OF TERAHERTZ TECHNOLOGY AND INNOVATION, Shenzhen (CN)

(72) Inventors: Hanjiang Chen, Shenzhen (CN); Tiansheng Zhang, Shenzhen (CN); Chunchao Qi, Shenzhen (CN); Shukai Zhao, Shenzhen (CN)

(73) Assignees: CHINA COMMUNICATION TECHNOLOGY CO., LTD., Shenzhen (CN); SHENZHEN INSTITUTE OF TERAHERTZ TECHNOLOGY AND INNOVATION, Shenzhen (CN)

( * ) Notice: Subject to any disclaimer, the term of this patent is extended or adjusted under 35 U.S.C. 154(b) by 114 days.

(21) Appl. No.: 16/330,298

(22) PCT Filed: Dec. 21, 2016

(86) PCT No.: PCT/CN2016/111231
§ 371 (c)(1),
(2) Date: Mar. 4, 2019

(87) PCT Pub. No.: WO2018/040399
PCT Pub. Date: Mar. 8, 2018

(65) Prior Publication Data
US 2019/0204473 A1    Jul. 4, 2019

(30) Foreign Application Priority Data
Sep. 5, 2016 (CN) .......................... 201610806958.9

(51) Int. Cl.
*G06K 9/00* (2006.01)
*G01V 8/26* (2006.01)
(Continued)

(52) U.S. Cl.
CPC ................ *G01V 8/26* (2013.01); *G01V 8/005* (2013.01); *G01V 8/10* (2013.01); *G01V 8/22* (2013.01); *G06K 9/00362* (2013.01)

(58) Field of Classification Search
CPC ... G01V 8/10; G01V 8/22; G01V 8/26; G06K 9/00362; G06K 9/00771; G06K 9/2018
(Continued)

(56) References Cited

U.S. PATENT DOCUMENTS 8,885,938 B2 * 11/2014 Hong .................... G06K 9/6247
382/173

FOREIGN PATENT DOCUMENTS

CN    102608672    7/2012
CN    103149598    6/2013
(Continued)

*Primary Examiner* — Que Tan Le
(74) *Attorney, Agent, or Firm* — Jason P. Mueller; FisherBroyles, LLP (57) ABSTRACT

A terahertz security check method and system may include: a terahertz scanning device collecting a terahertz original image of a human body under test, and sending the same to a central server that identifies the terahertz original image, and determines whether the human body under test carries an article. If so, the image is marked with the position of the article and sent to a monitoring terminal. The monitoring terminal correspondingly marking the position of the article on a pre-stored human body cartoon image, and displaying the terahertz original images before and after marking to monitoring personnel, so that the monitoring personnel determine whether the central server has an identification error; and if so, the monitoring terminal changing a marker
(Continued)

on the human body cartoon image, and sending the changed cartoon image to a client of security check personnel for displaying.

10 Claims, 5 Drawing Sheets

(51) Int. Cl.
    *G01V 8/10*     (2006.01)
    *G01V 8/00*     (2006.01)
    *G01V 8/22*     (2006.01)

(58) Field of Classification Search
    USPC .................................. 250/208.1, 221, 214 R
    See application file for complete search history.

(56) References Cited

FOREIGN PATENT DOCUMENTS

| | | |
|---|---|---|
| CN | 104849770 | 8/2015 |
| WO | 2013117920 | 8/2013 |

\* cited by examiner

FIG. 1

| human body front terahertz original image | human body back terahertz original image | marked human body front terahertz original image | marked human body back terahertz original image | marked human body front cartoon image | marked human body back cartoon image |

TERAHERTZ SECURITY CHECK METHOD AND SYSTEM COMPRISING A MARKER IDENTIFICATION MODULE AND A MARKER CHANGING MODULE

CROSS-REFERENCE TO RELATED APPLICATIONS

This application is a national stage entry under 35 U.S.C. 371 of PCT Patent Application No. PCT/CN2016/111231, filed Dec. 21, 2016, which claims priority to Chinese Patent Application No. 201610806958.9, filed Sep. 5, 2016, the entire contents of each of which are incorporated herein by reference.

TECHNICAL FIELD

The disclosure belongs to the technical field of security check, and particularly relates to a terahertz security check method and system.

BACKGROUND ART

Terahertz wave is electromagnetic wave with a frequency of 0.1-10 THz, which has strong penetrability and can easily penetrate clothing. At present, most of the security check devices used in public places such as airports, railway stations, subway stations and long-distance bus stations are terahertz security check devices. When a terahertz human body security check device is used, a two-dimensional terahertz "snapshot" of a human body is formed by scanning terahertz waves emitted by the human body and processing and converting the terahertz waves emitted by the human body; when an article is hidden in the clothes on the human body, the article absorbs and blocks the normal track of the terahertz waves, so that a slight contrast is generated between the position of the corresponding article and the human body background in the "snapshot", in this way, whether the human body carries an article can be detected through the terahertz "snapshot". However, in the existing terahertz human body security check device, the terahertz "snapshot" is usually automatically identified by an image identification system, and then an identified human body image and the position of the article in the human body image are displayed on a display screen of a security check terminal in the form of cartoon images for security check personnel to check; due to certain errors in the resolution, image processing and mode identification of the device in terms of article characteristics and dimensions, the conditions of missing check and false check may occur when using the method of automatically identifying the terahertz "snapshot" by the image identification system.

BRIEF SUMMARY OF THE INVENTION

An exemplary embodiment of the disclosure aims to provide a terahertz security check method and system, to prevent conditions of missing check and false check that may occur when using a method of automatically identifying a terahertz "snapshot" by an image identification system.

The exemplary embodiment of the disclosure is realized as follows: the terahertz security check method comprises:

a terahertz scanning device being controlled by a monitoring terminal or client to collect a terahertz original image of a human body under test, and sending the same to a central server for image identification;

the central server determining whether the human body under test carries an article by identifying the terahertz image, and if so, marking the position of the article in the terahertz original image to generate a terahertz original image with a marker, and sending the terahertz original image and the terahertz original image with the marker to the monitoring terminal;

the monitoring terminal correspondingly marking, according to the terahertz original image with the marker, the position of the article on a pre-stored human body cartoon image, and displaying the terahertz original image and the original image with the marker to monitoring personnel, so that the monitoring personnel determine whether the central server has an identification error; and if so, the monitoring terminal changing, according to an instruction input by the monitoring personnel, a marker on the human body cartoon image, and sending the changed human body cartoon image to a client of security check personnel for displaying, so that the security check personnel determine whether the human body under test carries an article according to the changed human body cartoon image.

Based on the above technical scheme, before sending the changed human body cartoon image to the client of the security check personnel for displaying, so that the security check personnel determine whether the human body under test carries an article according to the changed human body cartoon image, the method further comprises:

displaying a list containing various dangerous article icons on a display screen of the monitoring terminal for the monitoring personnel to choose from; and receiving a dangerous article icon chosen by the monitoring personnel from the list, and importing the dangerous article icon chosen by the monitoring personnel into the corresponding marker on the cartoon image.

Based on the above technical schemes, before the terahertz scanning device is controlled by the monitoring terminal or client to collect the terahertz original image of the human body under test, and sending the same to the central server for image identification, the method further comprises:

setting a security check mode of the monitoring terminal as a semi-automatic security check mode, wherein the security check mode comprises the semi-automatic security check mode and a fully-automatic security check mode.

Based on the above technical schemes, the method further comprises:

lighting a scanning state indicator light on the client when the terahertz scanning device is controlled by the monitoring terminal or client to collect the terahertz original image of the human body under test, so as to remind the security check personnel that the human body under test is being scanned; and after the monitoring terminal sends the changed human body cartoon image to the client of the security check personnel for displaying, the method further comprises:

turning off the scanning state indicator light on the client to remind the security check personnel that scanning of the human body under test is over.

Based on the above technical schemes, the terahertz original image comprises a human body front terahertz original image and a human body back terahertz original image.

Another object of the disclosure is to provide a terahertz security check system, comprising a terahertz scanning device, a central server, a monitoring terminal and a client, the monitoring terminal comprising a first starting module, a marker identification module, a first display module and a marker changing module, and the client comprising a second starting module and a second display module, wherein:

the terahertz scanning device is controlled by the first starting module on the monitoring terminal or the second starting module on the client to collect a terahertz original image of a human body under test, and send the same to the central server for image identification;

the central server is used for determining whether the human body under test carries an article by identifying the terahertz image, and if so, marking the position of the article in the terahertz original image to generate a terahertz original image with a marker, and sending the terahertz original image and the terahertz original image with the marker to the monitoring terminal;

the marker identification module is used for correspondingly marking, according to the terahertz original image with the marker, the position of the article on a pre-stored human body cartoon image;

the first display module is used for displaying the terahertz original image and the original image with the marker to monitoring personnel, so that the monitoring personnel determine whether the central server has an identification error;

the marker changing module is used for changing, according to an instruction input by the monitoring personnel, a marker on the human body cartoon image on the monitoring terminal if there is an identification error, and sending the changed human body cartoon image to the client of security check personnel; and the second display module is used for displaying the changed human body cartoon image, so that the security check personnel determine whether the human body under test carries an article according to the changed human body cartoon image.

Based on the above technical scheme, the monitoring terminal further comprises:

a dangerous article category marking module used for displaying a list containing various dangerous article icons on a display screen of the monitoring terminal for the monitoring personnel to choose from, receiving a dangerous article icon chosen by the monitoring personnel from the list, and importing the dangerous article icon chosen by the monitoring personnel into the corresponding marker on the cartoon image.

Based on the above technical schemes, the monitoring terminal further comprises:

a security check mode switching module used for setting a security check mode of the monitoring terminal as a semi-automatic security check mode, wherein the security check mode comprises the semi-automatic security check mode and a fully-automatic security check mode.

Based on the above technical schemes, the monitoring terminal further comprises:

a scanning indicator light control module used for lighting a scanning state indicator light on the client when the terahertz scanning device collects the terahertz original image of the human body under test, so as to remind the security check personnel that the human body under test is being scanned, and turning off the scanning state indicator light on the client after the monitoring terminal sends the changed human body cartoon image to the client of the security check personnel for displaying, so as to remind the security check personnel that scanning of the human body under test is over.

Based on the above technical schemes, the terahertz original image comprises a human body front terahertz original image and a human body back terahertz original image.

The terahertz security check method and system provided by the disclosure have the following beneficial effects:

according to the disclosure, the terahertz scanning device is controlled by the monitoring terminal or client to collect the terahertz original image of the human body under test, and send the same to the central server for image identification; the central server determines whether the human body under test carries an article by identifying the terahertz image, and if so, marks the position of the article in the terahertz original image to generate the terahertz original image with marker, and sends the terahertz original image and the terahertz original image with marker to the monitoring terminal; the monitoring terminal correspondingly marks, according to the terahertz original image with the marker, the position of the article on the pre-stored human body cartoon image, and displays the terahertz original image and the original image with the marker to the monitoring personnel, so that the monitoring personnel determine whether the central server has an identification error; and if so, the monitoring terminal changes, according to the instruction input by the monitoring personnel, the marker on the human body cartoon image, and sends the changed human body cartoon image to the client of the security check personnel for displaying, so that the security check personnel determine whether the human body under test carries an article according to the changed human body cartoon image, thus improving the accuracy of image identification in security check and preventing the conditions of missing check and false check.

DETAILED DESCRIPTION OF THE INVENTION

In order to make the object, technical scheme and advantages of the disclosure clearer, exemplary embodiments will be described in further detail below with reference to the drawings and embodiments. It should be understood that the specific embodiments described herein are only used to illustrate exemplary embodiments of the disclosure and are not configured to limit the disclosure.

Figure 1:
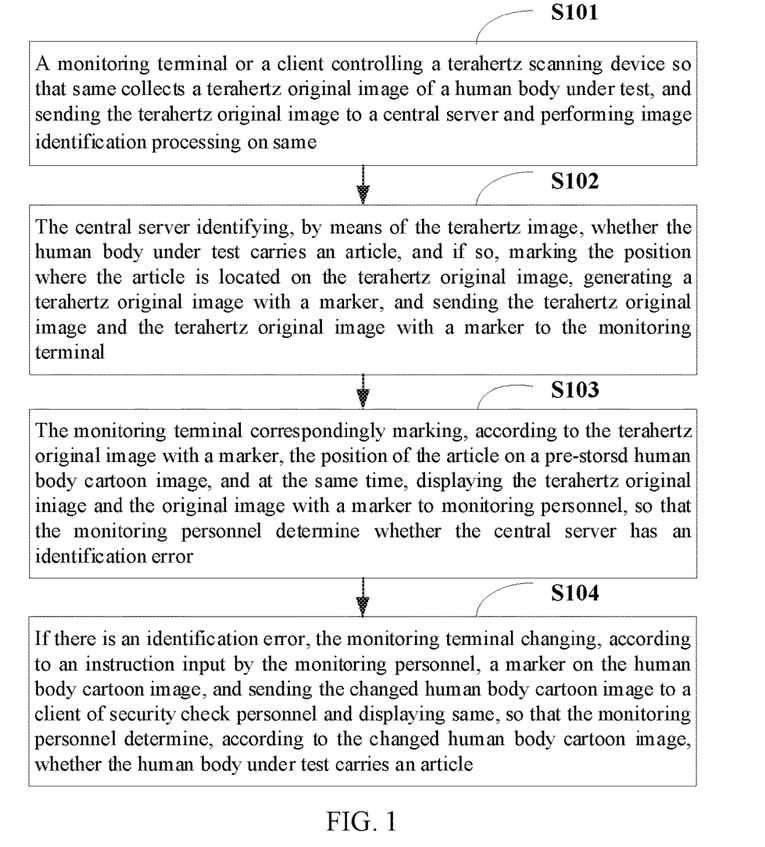
FIG. 1 is a flow chart of specific implementation of a terahertz security check method provided by an exemplary embodiment of the disclosure.

FIG. 1 is a flow chart of specific implementation of a terahertz security check method provided by the disclosure. As shown in FIG. 1, the terahertz security check method provided by the present exemplary embodiment may comprise:

S101, a terahertz scanning device controlled by a monitoring terminal or client to collect a terahertz original image of a human body under test, and send the same to a central server for image identification.

In the present exemplary embodiment, a monitoring start button of the monitoring terminal or a detection start button of the client triggers the terahertz scanning device to collect the terahertz original image of the human body under test, wherein the terahertz original image comprises a human body front terahertz original image and a human body back terahertz original image.

S102, the central server determines whether the human body under test carries an article by identifying the terahertz image, and if so, marks the position of the article in the terahertz original image to generate a terahertz original image with a marker, and sends the terahertz original image and the terahertz original image with the marker to the monitoring terminal.

In the present exemplary embodiment, the central server can automatically identify and mark the positions of the article in the human body front terahertz original image and the human body back terahertz original image respectively according to an image identification algorithm, and then send the marked human body front terahertz original image, the marked human body back terahertz original image, the human body front terahertz original image before marking and the human body back terahertz original image before marking to the monitoring terminal.

S103, the monitoring terminal correspondingly marks, according to the terahertz original image with the marker, the position of the article on a pre-stored human body cartoon image, and displays the terahertz original image and the original image with the marker to monitoring personnel, so that the monitoring personnel determine whether the central server has an identification error.

Figure 2:
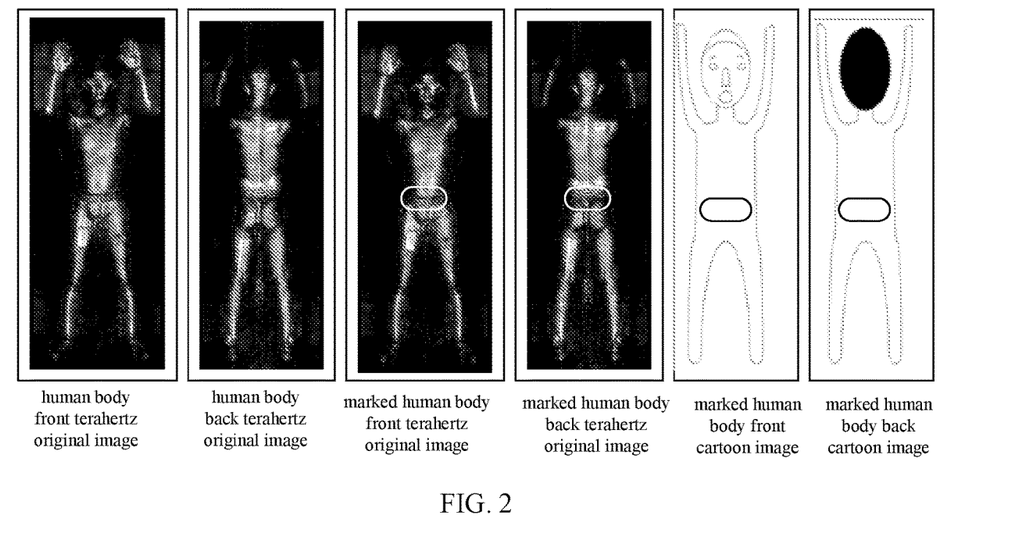
FIG. 2 is a schematic diagram of terahertz original images before and after marking and a human body cartoon image with a marker in a terahertz security check method provided by an exemplary embodiment of the disclosure.

In the present exemplary embodiment, after receiving the terahertz original images before and after marking sent by the central server, the monitoring terminal automatically and correspondingly marks, according to the terahertz original image with the marker, the position of the article on the pre-stored human body cartoon image, and displays the terahertz original images before and after marking and the marked human body cartoon image to the monitoring personnel at the monitoring terminal, so that the monitoring personnel can analyze whether there is missing check or false check according to the terahertz original images before and after marking, wherein the schematic diagrams of the terahertz original images before and after marking and the human body cartoon image with the marker in the terahertz security check method are shown in FIG. 2.

In addition, it should be noted that in the present exemplary embodiment, the monitoring terminal is also provided with a "play" button for continuously playing the terahertz original images displayed on a display screen, a "pause" button for controlling the monitoring terminal to stop continuously playing the terahertz original images, a "back" button for viewing the terahertz original image of the previous frame, a "next" button for viewing the terahertz original image of the next frame, and a function button for partially enlarging the images. The monitoring personnel at the monitoring terminal can control the monitoring terminal to display the terahertz original image which the monitoring personnel need to browse by the buttons, and can partially enlarge the selected terahertz original image so as to judge whether there is missing check or false check more accurately.

S104, if there is an identification error, the monitoring terminal changes, according to an instruction input by the monitoring personnel, a marker on the human body cartoon image, and sends the changed human body cartoon image to a client of security check personnel for displaying, so that the security check personnel determine whether the human body under test carries an article according to the changed human body cartoon image.

In the present exemplary embodiment, if the monitoring personnel find there is missing check or false check, they can manually change the marker on the human body cartoon image for showing the position of the article on the human body, and then click a transmission button on the monitoring terminal to transmit the changed human body cartoon image to the client carried by the security personnel for displaying, so that the security personnel can judge whether an article is hidden on the human body under test according to the human body cartoon image displayed on the client.

As can be seen, according to the terahertz security check method for the human body provided by the present exemplary embodiment, the terahertz scanning device is controlled by the monitoring terminal or client to collect the terahertz original image of the human body under test, and send the same to the central server for image identification; the central server determines whether the human body under test carries an article by identifying the terahertz image, and if so, marks the position of the article in the terahertz original image to generate the terahertz original image with the marker, and sends the terahertz original image and the terahertz original image with the marker to the monitoring terminal; the monitoring terminal correspondingly marks, according to the terahertz original image with the marker, the position of the article on the pre-stored human body cartoon image, and displays the terahertz original image and the original image with the marker to the monitoring personnel, so that the monitoring personnel determine whether the central server has an identification error; and if so, the monitoring terminal changes, according to the instruction input by the monitoring personnel, the marker on the human body cartoon image, and sends the changed human body cartoon image to the client of the security check personnel for displaying, so that the security check personnel determine whether the human body under test carries an article according to the changed human body cartoon image, thus improving the accuracy of image identification in security check and preventing the conditions of missing check and false check.

Figure 3:
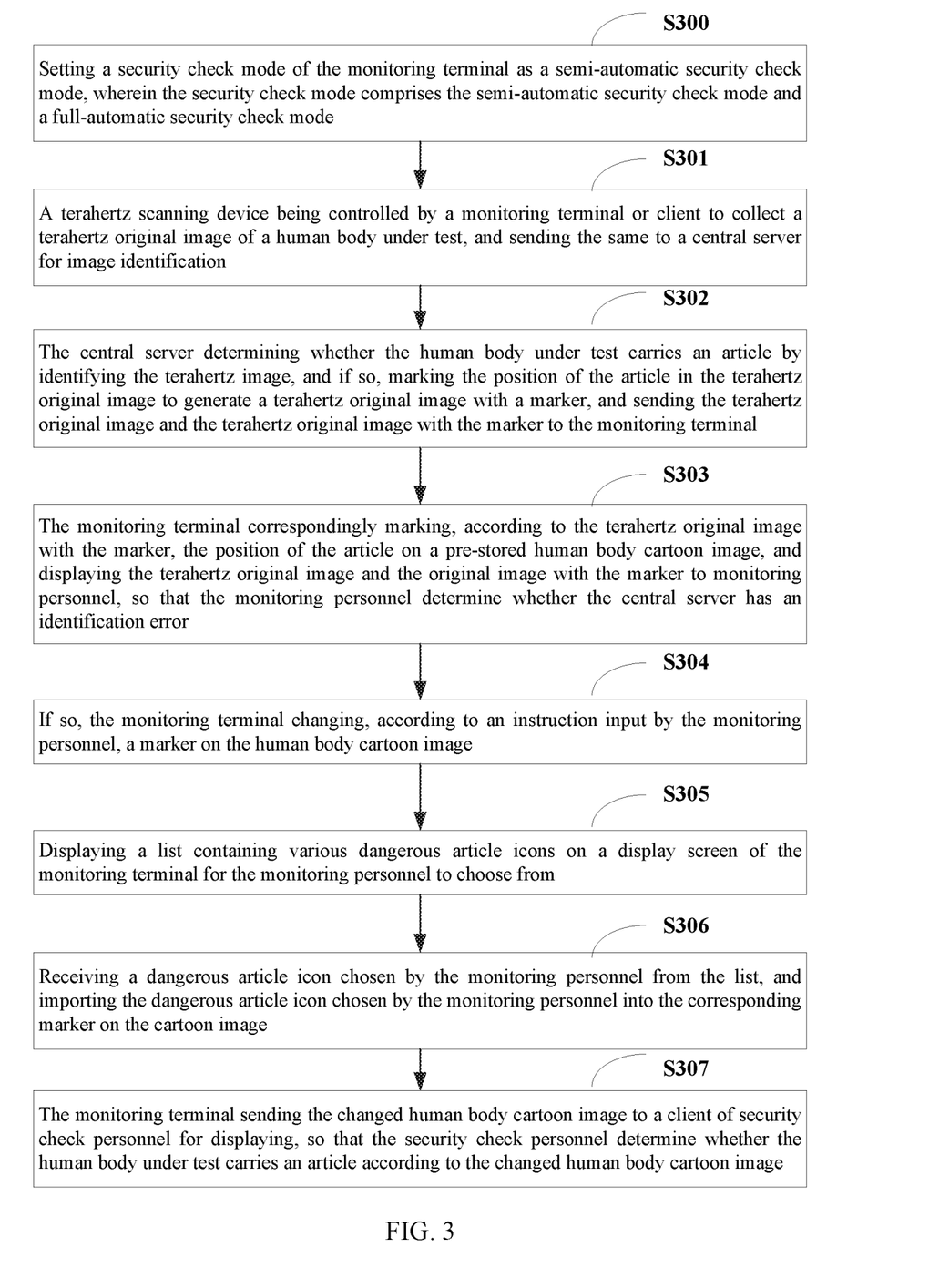
FIG. 3 is a flow chart of specific implementation of a terahertz security check method provided by another exemplary embodiment of the disclosure.

FIG. 3 is a flow chart of the specific implementation of a terahertz security check method provided by another exemplary embodiment of the disclosure. As shown in FIG. 3, compared to the previous exemplary embodiment, before the terahertz scanning device is controlled by the monitoring terminal or client to collect the terahertz original image of the human body under test, and sending the same to the central server for image identification, a terahertz security check method provided by the present exemplary embodiment further comprises:

S300, setting a security check mode of the monitoring terminal as a semi-automatic security check mode, wherein the security check mode comprises the semi-automatic security check mode and a fully-automatic security check mode.

In the present exemplary embodiment, the security check mode of the monitoring terminal comprises a semi-automatic security check mode and a fully-automatic security check mode. When the monitoring personnel select the semi-automatic security check mode, the processing flow of the terahertz security check method provided by the application starts; on the contrary, if the monitoring personnel select the fully-automatic security check mode, after the terahertz original images before and after marking are sent to the monitoring terminal by the central server, the monitoring terminal no longer displays the marked human body cartoon image to the monitoring personnel after performing automatic marking according to the marked terahertz original image on the pre-stored human body cartoon image, but directly sends the marked human body cartoon image to the client for displaying.

Further, compared to the previous exemplary embodiment, before sending the changed human body cartoon image to the client of the security check personnel for displaying, so that the security check personnel determine whether the human body under test carries an article according to the changed human body cartoon image, the method provided by the present exemplary embodiment further comprises:

S305, displaying a list containing various dangerous article icons on a display screen of the monitoring terminal for the monitoring personnel to choose from; and S306, receiving a dangerous article icon chosen by the monitoring personnel from the list, and importing the dangerous article icon chosen by the monitoring personnel into the corresponding marker on the cartoon image.

In the present exemplary embodiment, the dangerous article icon list comprises at least the dangerous article icons of ironmongery and the dangerous article images of inflammables, and the monitoring personnel can identify the category of dangerous articles according to the size and shape of the article marked by the marked terahertz original image, then select a corresponding dangerous article icon and add the same to the corresponding marker on the human body cartoon image, and then send the human body cartoon image to the client; in this way, the security check personnel at the client can not only judge whether the human body under test carries a dangerous article according to the human body cartoon image, but also directly obtain the category of the dangerous article carried by the human body under test, so as to take security measures in advance.

Further, compared to the previous exemplary embodiment, the terahertz security check method provided by the present exemplary embodiment further comprises:

lighting a scanning state indicator light on the client when the terahertz scanning device is controlled by the monitoring terminal or client to collect the terahertz original image of the human body under test, so as to remind the security check personnel that the human body under test is being scanned; and after the monitoring terminal sends the changed human body cartoon image to the client of the security check personnel for displaying, the method further comprises:

turning off the scanning state indicator light on the client to remind the security check personnel that scanning of the human body under test is over.

In the present exemplary embodiment, the scanning indicator light of the client can be controlled to be on and off according to the processing progress of the monitoring terminal. When the monitoring terminal is started, the scanning indicator light of the client is controlled to be on, reminding the security check personnel that the terahertz original image of the human body under test is being scanned; after the monitoring terminal sends the processed marked human body cartoon image to the client, the scanning indicator light of the client is controlled to be off, reminding the security check personnel that scanning of the human body under test is over, so that the security check personnel of the client can obtain the image processing progress of the monitoring terminal through the status of the scanning indicator light on the client.

It should be noted that S301-S304 in the present exemplary embodiment are the same as those in the previous exemplary embodiment, so they will not be repeated here.

As can be seen, compared to the previous exemplary embodiment, the terahertz security check method provided by the present exemplary embodiment not only can improve the accuracy of image identification in security check and prevent the conditions of missing check and false check, but also identify the category of a dangerous article carried by the human body under test, so that the security check personnel can take safety precautions, and in addition, the security check personnel can obtain the image processing progress of the monitoring terminal in real time.

Figure 4:
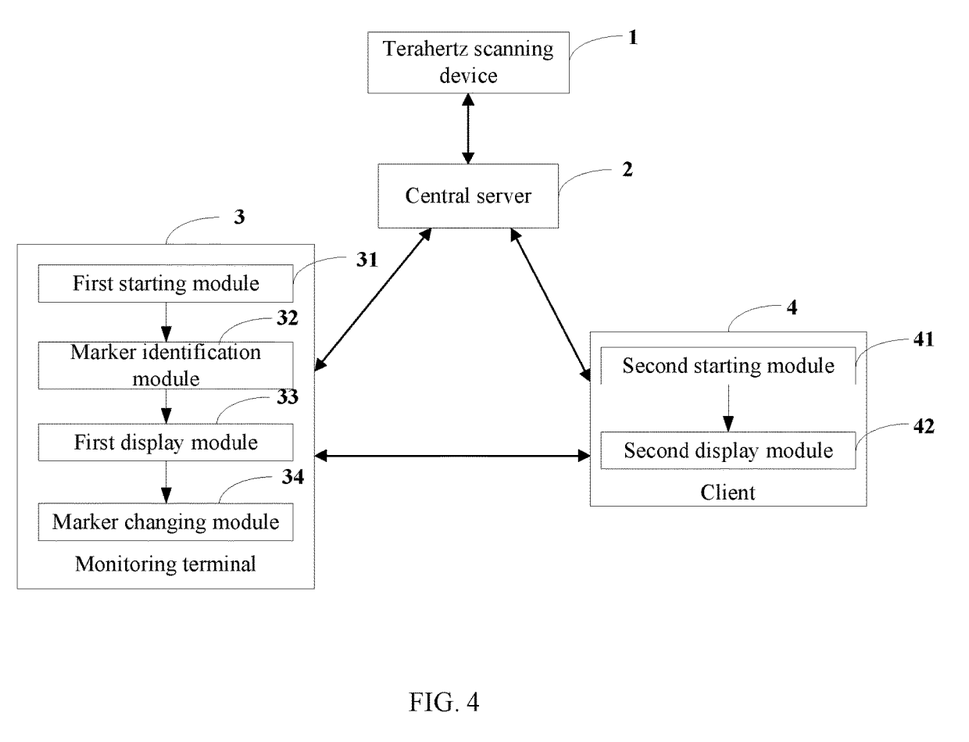
FIG. 4 is a schematic block diagram of a terahertz security check system provided by an exemplary embodiment of the disclosure.

FIG. 4 is a schematic block diagram of a terahertz security check system provided by an exemplary embodiment of the disclosure, and the system is used for implementing the method provided by the exemplary embodiment shown in FIG. 1. For convenience of explanation, only parts related to the present exemplary embodiment are shown.

As shown in FIG. 4, the present exemplary embodiment provides a terahertz security check system, comprising a terahertz scanning device 1, a central server 2, a monitoring terminal 3 and a client 4. The monitoring terminal 3 comprises a first starting module 31, a marker identification module 32, a first display module 33 and a marker changing module 34, and the client 4 comprises a second starting module 41 and a second display module 42, wherein:

the terahertz scanning device 1 is controlled by the first starting module 31 on the monitoring terminal 3 or the second starting module 41 on the client 4 to collect a terahertz original image of a human body under test, and send the same to the central server 2 for image identification;

the central server 2 is used for determining whether the human body under test carries an article by identifying the terahertz image, and if so, marking the position of the article in the terahertz original image to generate a terahertz original image with a marker, and sending the terahertz original image and the terahertz original image with the marker to the monitoring terminal 3;

the marker identification module 32 is used for correspondingly marking, according to the terahertz original image with the marker, the position of the article on a pre-stored human body cartoon image;

the first display module 33 is used for displaying the terahertz original image and the original image with the marker to monitoring personnel, so that the monitoring personnel determine whether the central server 2 has an identification error;

the marker changing module 34 is used for changing, according to an instruction input by the monitoring personnel, a marker on the human body cartoon image on the monitoring terminal 3 if there is an identification error, and sending the changed human body cartoon image to the client 4 of security check personnel; and the second display module 42 is used for displaying the changed human body cartoon image, so that the security check personnel determine whether the human body under test carries an article according to the changed human body cartoon image.

Optionally, the terahertz original image comprises a human body front terahertz original image and a human body back terahertz original image.

Figure 5:
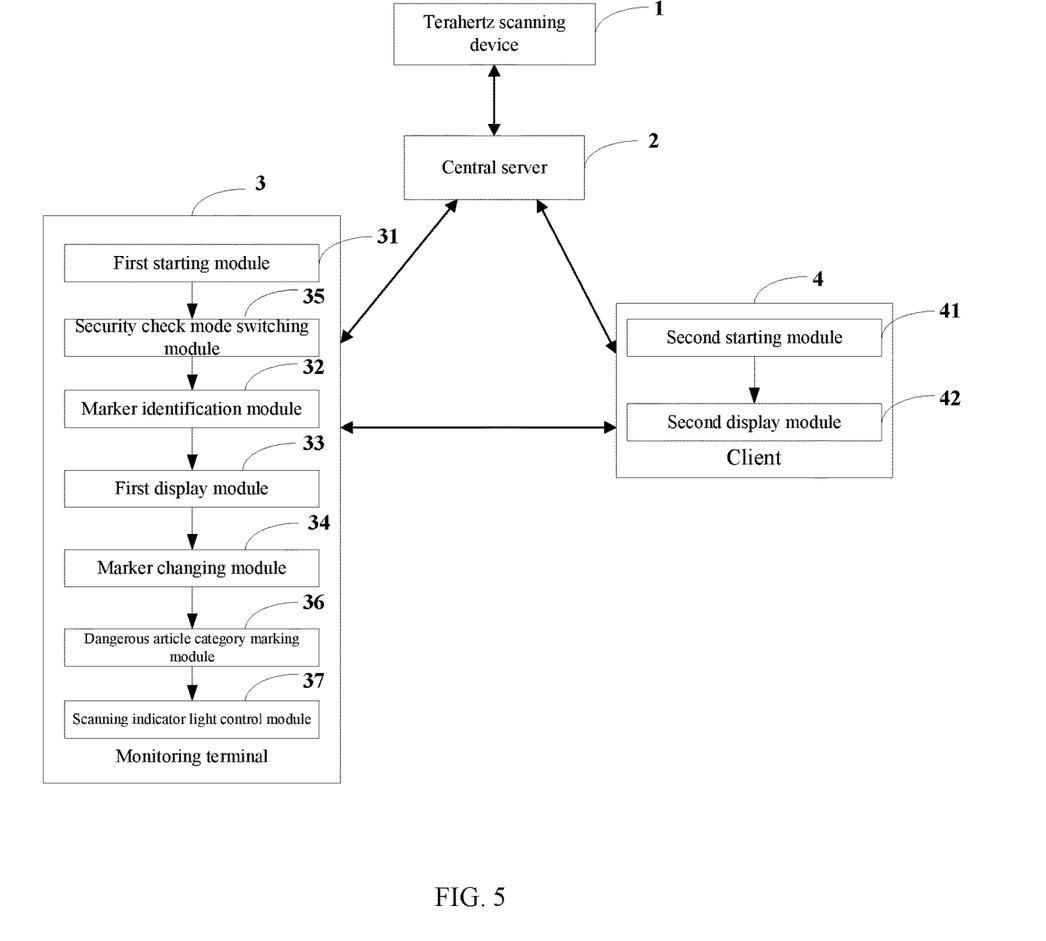
FIG. 5 is a schematic block diagram of a terahertz security check system provided by another exemplary embodiment of the disclosure.

Optionally, as shown in FIG. 5 which is a schematic block diagram of a terahertz security check system provided by another exemplary embodiment of the disclosure, the system is used for implementing the method provided by the exemplary embodiment shown in FIG. 3. In the present exemplary embodiment, the monitoring terminal 3 further comprises:

a dangerous article category marking module 36 used for displaying a list containing various dangerous article icons on a display screen of the monitoring terminal 3 for the monitoring personnel to choose from, receiving a dangerous article icon chosen by the monitoring personnel from the list, and importing the dangerous article icon chosen by the monitoring personnel into the corresponding marker on the cartoon image.

Optionally, in the present exemplary embodiment, the monitoring terminal 3 further comprises:

a security check mode switching module 35 used for setting a security check mode of the monitoring terminal as a semi-automatic security check mode, wherein the security check mode comprises the semi-automatic security check mode and a fully-automatic security check mode.

Optionally, in the present exemplary embodiment, the monitoring terminal 3 further comprises:

a scanning indicator light control module 37 used for lighting a scanning state indicator light on the client 4 when the terahertz scanning device 1 collects the terahertz original image of the human body under test, so as to remind the security check personnel that the human body under test is being scanned, and turning off the scanning state indicator light on the client 4 after the monitoring terminal 3 sends the changed human body cartoon image to the client 4 of the security check personnel for displaying, so as to remind the security check personnel that scanning of the human body under test is over.

It should be noted that each module in the above-mentioned terminal provided by the exemplary embodiment of the disclosure has the same technical effect as the exemplary embodiment of the method of the disclosure because it is based on the same concept as the exemplary embodiment of the method of the disclosure. The specific content can be seen in the description of the exemplary embodiment of the method of the disclosure and will not be repeated here.

Therefore, it can be seen that the terahertz security check system provided by the exemplary embodiment of the disclosure can also improve the accuracy of image identification in security check and prevent the conditions of missing check and false check, besides, the system can identify the category of a dangerous article carried by the human body under test, so that the security check personnel can take safety precautions, and in addition, the security check personnel can obtain the image processing progress of the monitoring terminal in real time.

Figure 6:
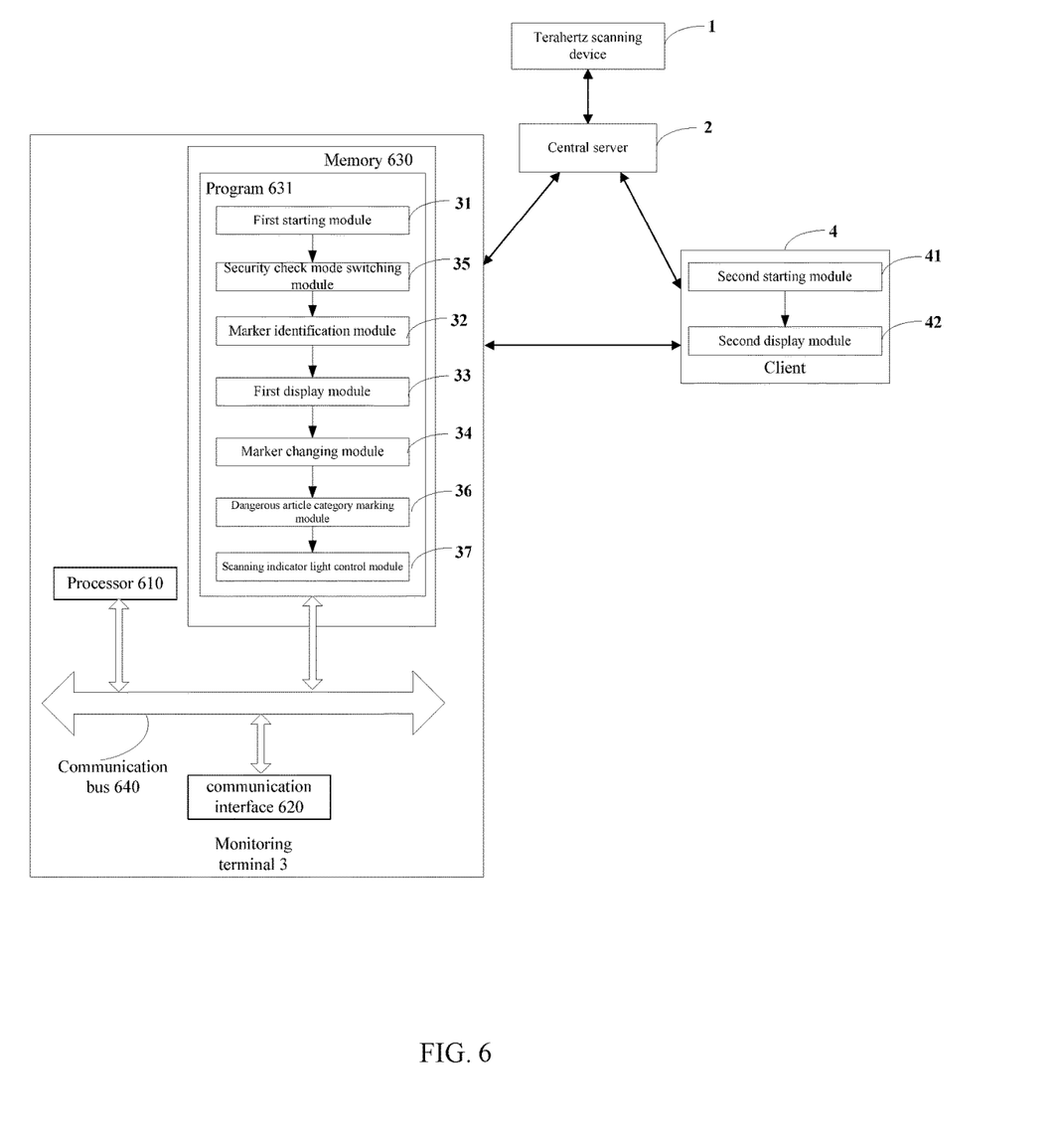
FIG. 6 is a schematic block diagram of a terahertz security check system provided by yet another exemplary embodiment of the disclosure.

FIG. 6 is a schematic block diagram of a terahertz security check system provided by yet another exemplary embodiment of the disclosure. For convenience of explanation, only parts related to the present exemplary embodiment are shown.

As shown in FIG. 6, the terahertz security check system provided by the present exemplary embodiment comprises a terahertz scanning device 1, a central server 2, a monitoring terminal 3 and a client 4, the client 4 comprises a second starting module 41 and a second display module 42, and the monitoring terminal 3 comprises:

a processor 610, a communications interface 620, a memory 630 and a bus 640.

Communication between the processor 610, the communications interface 620 and the memory 630 is realized through the bus 640.

The communications interface 620 is used for communicating with a cable modem.

The processor 610 is used for executing a program 631.

Specifically, the program 631 may comprise a program code including a computer operation instruction.

The processor 610 may be a central processing unit (CPU), or an application specific integrated circuit (ASIC), or one or more integrated circuits configured to implement the exemplary embodiments of the disclosure.

The memory 630 is used for storing the program 631. The memory 630 may include a high-speed RAM and may also include a non-volatile memory, such as at least one disk memory. The program 631 specifically comprises:

a first starting module 31, used for controlling a terahertz scanning device 1 to collect a terahertz original image of a human body under test, and sending the same to a central server 2 for image identification, so that the central server 2 determines whether the human body under test carries an article by identifying the terahertz image, and if so, marks the position of the article in the terahertz original image to generate a terahertz original image with a marker, and sends the terahertz original image and the terahertz original image with the marker to the monitoring terminal 3;

a marker identification module 32, used for correspondingly marking, according to the terahertz original image with the marker returned by the central server 2, the position of the article on a pre-stored human body cartoon image;

a first display module 33, used for displaying the terahertz original image and the original image with the marker to monitoring personnel, so that the monitoring personnel determine whether the central server 2 has an identification error; and a marker changing module 34, used for changing, according to an instruction input by the monitoring personnel, a marker on the human body cartoon image on the monitoring terminal 3 if there is an identification error, and sending the changed human body cartoon image to the client 4 of security check personnel, so that the second display module 42 of the client 4 displays the changed human body cartoon image, and the security check personnel determine whether the human body under test carries an article according to the changed human body cartoon image.

Optionally, the program 631 further comprises:

a dangerous article category marking module 36, used for displaying a list containing various dangerous article icons on a display screen of the monitoring terminal 3 for the monitoring personnel to choose from, receiving a dangerous article icon chosen by the monitoring personnel from the list, and importing the dangerous article icon chosen by the monitoring personnel into the corresponding marker on the cartoon image.

Optionally, the program 631 further comprises:

a security check mode switching module 35, used for setting a security check mode of the monitoring terminal as a semi-automatic security check mode, wherein the security check mode comprises the semi-automatic security check mode and a full-automatic security check mode.

Optionally, the program 631 further comprises:

a scanning indicator light control module 37, used for lighting a scanning state indicator light on the client 4 when the terahertz scanning device 1 collects the terahertz original image of the human body under test, so as to remind the security check personnel that the human body under test is being scanned, and turning off the scanning state indicator light on the client 4 after the monitoring terminal 3 sends the changed human body cartoon image to the client 4 of the security check personnel for displaying, so as to remind the security check personnel that scanning of the human body under test is over.

Those skilled in the art can clearly understand that for convenience and conciseness of description, the specific working process of the units in the terminal described above can refer to the corresponding process in the above method and will not be repeated here.

In the several exemplary embodiments provided by the present application, it should be understood that the disclosed terminal and method may be implemented in other manners. The device described above are merely schematic, for example, the division of the units is only one logical function division, and there may be another division manner in actual implementation, for example, multiple units or components may be combined or may be integrated into another system, or some features can be ignored or not implemented. In addition, the illustrated or discussed mutual coupling or direct coupling or communication may be indirect coupling or communication through some communications interfaces, devices or units, and may be electrical, mechanical or other forms.

The units described as separate parts may or may not be physically separated, and the parts displayed as units may or may not be physical units, that is, may be located in one place, or may be distributed on multiple network modules. Some or all of the units may be selected according to actual needs to achieve the purpose of the solution of the present disclosure.

In addition, the functional units in each exemplary embodiment of the present disclosure may be integrated in one processing unit, or each unit may exist alone physically, or two or more units may be integrated in one module.

The steps in the method of the disclosure can be adjusted in terms of sequence, merged and deleted according to actual needs.

The units in the terminal of the disclosure can be merged, divided and deleted according to actual needs.

The function, if implemented in the form of a software functional module and sold or used as a stand-alone product, may be stored in a terminal-readable storage medium. Based on such understanding, the technical solution of the disclosure may be essentially, or the part of the present disclosure which contributes to the prior art or part of the technical solution may be embodied in the form of a software product, and the computer software product is stored in a storage medium and comprises a plurality of instructions for causing a terminal (which may be a terminal, an IPAD, etc.) to perform all or part of the steps of the methods described in the various exemplary embodiments of the present disclosure. The foregoing storage medium includes a USB flash disk, a mobile hard disk, a read-only memory (ROM), a random access memory (RAM), a magnetic disk, a light disk and various other media which can store program codes.

Those skilled in the art can clearly understand that for convenience and conciseness of description, the specific working process of the system and units described above can refer to the corresponding process in the above method and will not be repeated here.

The above is only an exemplary embodiment of the disclosure and is not intended to limit the disclosure. Any modifications, equivalent substitutions, improvements, etc. made within the spirit and principles of the disclosure should be included within the scope of protection of the disclosure.

What is claimed is:

1. A terahertz security check method, characterized in that comprising:

a terahertz scanning device being controlled by a monitoring terminal or client to collect a terahertz original image of a human body under test, and sending the same to a central server for image identification;

the central server determining whether the human body under test carries an article by identifying the terahertz image, and if so, marking the position of the article in the terahertz original image to generate a terahertz original image with a marker, and sending the terahertz original image and the terahertz original image with the marker to the monitoring terminal;

the monitoring terminal correspondingly marking, according to the terahertz original image with the marker, the position of the article on a pre-stored human body cartoon image, and displaying the terahertz original image and the original image with the marker to monitoring personnel, so that the monitoring personnel determine whether the central server has an identification error; and if so, the monitoring terminal changing, according to an instruction input by the monitoring personnel, a marker on the human body cartoon image, and sending the changed human body cartoon image to a client of security check personnel for displaying, so that the security check personnel determine whether the human body under test carries an article according to the changed human body cartoon image.

2. The terahertz security check method of claim 1, characterized in that before sending the changed human body cartoon image to the client of the security check personnel for displaying, so that the security check personnel determine whether the human body under test carries an article according to the changed human body cartoon image, the method further comprises:

displaying a list containing various dangerous article icons on a display screen of the monitoring terminal for the monitoring personnel to choose from; and receiving a dangerous article icon chosen by the monitoring personnel from the list, and importing the dangerous article icon chosen by the monitoring personnel into the corresponding marker on the cartoon image.

3. The terahertz security check method of claim 1, characterized in that before the terahertz scanning device is controlled by the monitoring terminal or client to collect the terahertz original image of the human body under test, and sending the same to the central server for image identification, the method further comprises:

setting a security check mode of the monitoring terminal as a semi-automatic security check mode, wherein the security check mode comprises the semi-automatic security check mode and a fully-automatic security check mode.

4. The terahertz security check method of claim 1, characterized in that the method further comprises:

lighting a scanning state indicator light on the client when the terahertz scanning device is controlled by the monitoring terminal or client to collect the terahertz original image of the human body under test, so as to remind the security check personnel that the human body under test is being scanned; and after the monitoring terminal sends the changed human body cartoon image to the client of the security check personnel for displaying, the method further comprises:
  turning off the scanning state indicator light on the client to remind the security check personnel that scanning of the human body under test is over.

5. The terahertz security check method of claim 1, characterized in that the terahertz original image comprises a human body front terahertz original image and a human body back terahertz original image.

6. A terahertz security check system, characterized in that comprising a terahertz scanning device, a central server, a monitoring terminal and a client, the monitoring terminal comprising a first starting module, a marker identification module, a first display module and a marker changing module, and the client comprising a second starting module and a second display module, wherein:
  the terahertz scanning device is controlled by the first starting module on the monitoring terminal or the second starting module on the client to collect a terahertz original image of a human body under test, and send the image to the central server for image identification;
  the central server is used for determining whether the human body under test carries an article by identifying the terahertz image, and if so, marking the position of the article in the terahertz original image to generate a terahertz original image with a marker, and sending the terahertz original image and the terahertz original image with the marker to the monitoring terminal;
  the marker identification module is used for correspondingly marking, according to the terahertz original image with the marker, the position of the article on a pre-stored human body cartoon image;
  the first display module is used for displaying the terahertz original image and the original image with the marker to monitoring personnel, so that the monitoring personnel determine whether the central server has an identification error;
  the marker changing module is used for changing, according to an instruction input by the monitoring personnel, a marker on the human body cartoon image on the monitoring terminal if there is an identification error, and sending the changed human body cartoon image to the client of security check personnel; and
  the second display module is used for displaying the changed human body cartoon image, so that the security check personnel determine whether the human body under test carries an article according to the changed human body cartoon image.

7. The terahertz security check system of claim 6, characterized in that the monitoring terminal further comprises:
  a dangerous article category marking module, used for displaying a list containing various dangerous article icons on a display screen of the monitoring terminal for the monitoring personnel to choose from, receiving a dangerous article icon chosen by the monitoring personnel from the list, and importing the dangerous article icon chosen by the monitoring personnel into the corresponding marker on the cartoon image.

8. The terahertz security check system of claim 6, characterized in that the monitoring terminal further comprises:
  a security check mode switching module used for setting a security check mode of the monitoring terminal as a semi-automatic security check mode, wherein the security check mode comprises the semi-automatic security check mode and a fully-automatic security check mode.

9. The terahertz security check system of claim 6, characterized in that the monitoring terminal further comprises:
  a scanning indicator light control module, used for lighting a scanning state indicator light on the client when the terahertz scanning device collects the terahertz original image of the human body under test, so as to remind the security check personnel that the human body under test is being scanned, and turning off the scanning state indicator light on the client after the monitoring terminal sends the changed human body cartoon image to the client of the security check personnel for displaying, so as to remind the security check personnel that scanning of the human body under test is over.

10. The terahertz security check system of claim 6, characterized in that the terahertz original image comprises a human body front terahertz original image and a human body back terahertz original image.

* * * * *